(12) United States Patent
Uchida et al.

(10) Patent No.: US 11,081,700 B2
(45) Date of Patent: Aug. 3, 2021

(54) NONAQUEOUS ELECTROLYTE SECONDARY BATTERY AND METHOD FOR PRODUCING NONAQUEOUS ELECTROLYTE SECONDARY BATTERY

(71) Applicant: SANYO Electric Co., Ltd., Osaka (JP)

(72) Inventors: Naoki Uchida, Hyogo (JP); Haruya Nakai, Hyogo (JP); Ayumi Kochi, Osaka (JP)

(73) Assignee: SANYO Electric Co., Ltd., Osaka (JP)

( * ) Notice: Subject to any disclaimer, the term of this patent is extended or adjusted under 35 U.S.C. 154(b) by 0 days.

(21) Appl. No.: 16/550,689

(22) Filed: Aug. 26, 2019

(65) Prior Publication Data
US 2020/0075958 A1 Mar. 5, 2020

(30) Foreign Application Priority Data

Aug. 30, 2018 (JP) .............................. JP2018-162113

(51) Int. Cl.
*H01M 4/62* (2006.01)
*H01M 10/0525* (2010.01)
(Continued)

(52) U.S. Cl.
CPC ......... *H01M 4/622* (2013.01); *H01M 4/0404* (2013.01); *H01M 4/0435* (2013.01); *H01M 4/133* (2013.01); *H01M 4/1393* (2013.01); *H01M 4/366* (2013.01); *H01M 4/587* (2013.01); *H01M 10/0525* (2013.01); *H01M 2004/027* (2013.01)

(58) Field of Classification Search
CPC .. H01M 4/622; H01M 4/0404; H01M 4/0435; H01M 4/133; H01M 4/366; H01M 4/587; H01M 4/1393; H01M 4/621; H01M 4/362; H01M 4/139; H01M 10/0525; H01M 2004/027; H01M 2004/021; H01M 6/623
See application file for complete search history.

(56) References Cited

U.S. PATENT DOCUMENTS

2015/0263333 A1* 9/2015 Kinugawa ............. H01M 4/139
429/217
2015/0303478 A1 10/2015 Kinugawa et al.

FOREIGN PATENT DOCUMENTS

| JP | 2011192539 | * | 9/2011 |
| WO | 2014/068904 A1 | | 5/2014 |
| WO | 2014/068905 A1 | | 5/2014 |

* cited by examiner

*Primary Examiner* — Ula C Ruddock
*Assistant Examiner* — Matthew W Van Oudenaren
(74) *Attorney, Agent, or Firm* — Westerman, Hattori, Daniels & Adrian, LLP

(57) ABSTRACT

A nonaqueous electrolyte secondary battery according to an embodiment of the present disclosure includes a negative electrode including a negative electrode core and negative electrode mixture layers formed on both surfaces of the negative electrode core. Each of the negative electrode mixture layers contains a cellulose-based binder composed of at least one of carboxymethyl cellulose and a salt thereof. When each of the negative electrode mixture layers is divided in half, at the center in the thickness direction, into a first region near the negative electrode core and a second region far from the negative electrode core, the content of the cellulose-based binder present in the first region is 35% by mass or more and less than 50% by mass of the total mass of the cellulose-based binder contained in the entire of each of the negative electrode mixture layers.

3 Claims, 2 Drawing Sheets

(51) Int. Cl.
*H01M 4/04* (2006.01)
*H01M 4/133* (2010.01)
*H01M 4/1393* (2010.01)
*H01M 4/36* (2006.01)
*H01M 4/587* (2010.01)
*H01M 4/02* (2006.01)

NONAQUEOUS ELECTROLYTE SECONDARY BATTERY AND METHOD FOR PRODUCING NONAQUEOUS ELECTROLYTE SECONDARY BATTERY

CROSS REFERENCE TO RELATED APPLICATIONS

The present invention application claims priority to Japanese Patent Application No. 2018-162113 filed in the Japan Patent Office on Aug. 30, 2018, the entire contents of which are incorporated herein by reference.

BACKGROUND OF THE INVENTION

Field of the Invention

The present disclosure relates to a nonaqueous electrolyte secondary battery and a method for producing a nonaqueous electrolyte secondary battery.

Description of Related Art

A negative electrode constituting a nonaqueous electrolyte secondary battery generally has a negative electrode core and negative electrode mixture layers formed on both surfaces of the negative electrode core. Each of the negative electrode mixture layers contains a negative electrode active material and a binder, and the binder bonds negative electrode active material particles to each other and bonds the active material to the negative electrode core to maintain a layer structure.

For the purpose of improving the cycle characteristics of a battery, there has been proposed a nonaqueous electrolyte secondary battery including a negative electrode in which the rubber-based binder distribution in the thickness direction of a negative electrode mixture layer is controlled to be a specific distribution (refer to International Publication Nos. 2014/068904 and 2014/068905).

BRIEF SUMMARY OF THE INVENTION

Also, when a nonaqueous electrolyte secondary battery is placed in a low-temperature environment such as at −30° C., the viscosity of an electrolytic solution is increased, and thus the internal resistance is significantly increased. It has been recently demanded to suppress the internal resistance of a battery even in a low-temperature environment. In addition, from the viewpoint of reducing the production cost and improving quality, etc., securing good productivity is an important problem.

A nonaqueous electrolyte secondary battery according to an aspect of the present disclosure includes an electrode body, which has a positive electrode, a negative electrode, and a separator, and a nonaqueous electrolyte. The negative electrode includes a negative electrode core and negative electrode mixture layers formed on both surfaces of the negative electrode core. Each of the negative electrode mixture layers contains a cellulose-based binder composed of at least one of carboxymethyl cellulose and a salt thereof. When each of the negative electrode mixture layers is divided in half, at the center in the thickness direction, into a first region near the negative electrode core and a second region far from the negative electrode core, the content of the cellulose-based binder present in the first region is 35% by mass or more and less than 50% by mass of the total mass of the cellulose-based binder contained in the entire of each of the negative electrode mixture layers.

A method for producing a nonaqueous electrolyte secondary battery according to an aspect of the present disclosure is a method for producing a nonaqueous electrolyte secondary battery including an electrode body having a positive electrode, a negative electrode, and a separator, and a nonaqueous electrolyte. A process for producing the negative electrode includes a step of forming a first coating film by applying a first negative electrode mixture slurry on the surface of the negative electrode core, a step of forming a second coating film by applying a second negative electrode mixture slurry on the first coating film, and a step of compressing the first and second coating films by using a compression roller. Each of the first and second negative electrode mixture slurries contains a negative electrode active material, a dispersion medium, and a cellulose-based binder composed of at least one of carboxymethyl cellulose and a salt thereof, the solid content of the cellulose-based binder in the first negative electrode mixture slurry being lower than the solid content of the cellulose-based binder in the second negative electrode mixture slurry. The first and second negative electrode mixture slurries are applied so that when each of the negative electrode mixture layers each containing the first and second coating films is divided in half, at the center in the thickness direction, into a first region near the negative electrode core and a second region far from the negative electrode core, the content of the cellulose-based binder present in the first region is 35% by mass or more and less than 50% by mass of the total mass of the cellulose-based binder contained in the entire of each of the negative electrode mixture layers.

According to an embodiment of the present disclosure, it is possible to provide a nonaqueous electrolyte secondary battery capable of suppressing the internal resistance even in a low-temperature environment while securing good productivity.

DETAILED DESCRIPTION OF THE INVENTION

Figure 1:
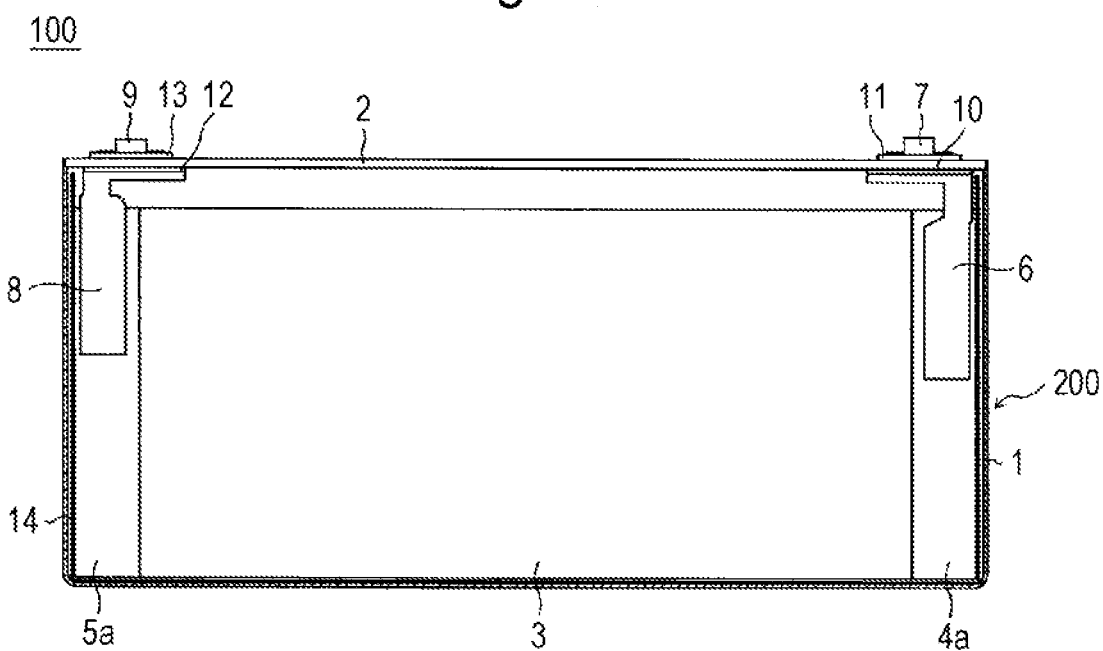
FIG. 1 is a front view showing an example of a nonaqueous electrolyte secondary battery according to an embodiment of the present disclosure with the front parts of a battery case and of an insulating sheet being removed.

As described above, in a low-temperature environment such as at −30° C., the impregnation rate of an electrolytic solution to a negative electrode mixture layer is decreased due to an increase in viscosity, and particularly, the supply of lithium ions to a negative electrode active material present in a first region on the negative electrode core side is stagnated. That is, in the low-temperature environment, a large concentration gradient occurs in the electrolytic solution in the thickness direction of the negative electrode mixture layer, and thus the internal resistance is considered to be increased due to rate-limiting battery reaction in the first region with a low concentration of the electrolytic solution. As a result of earnest investigation for solving the problem described above, the inventors found that when in the thickness direction of the negative electrode mixture layer, the content of the cellulose-based binder present in the first region on the negative electrode core side is 35% by mass or more and less than 50% by mass of the total mass of the binder contained in the entire of the negative electrode mixture layer, the internal resistance of the battery in the low-temperature environment is greatly decreased.

There have recently been many investigations for improving an electrolytic solution in order to improve the low-temperature characteristics of a battery, but no attempt has been made to improve the low-temperature characteristics of a battery with the attention to a cellulose-based binder of the negative electrode. In a nonaqueous electrolyte secondary battery according to the present disclosure, the content of the cellulose-based binder present in the first region of the negative electrode mixture layer is adjusted within the range described above, and thus the steric hindrance of the cellulose-based binder is decreased in the first region. It is thus considered that the large concentration gradient occurring in the electrolytic solution in the low-temperature environment is relieved. The nonaqueous electrolyte secondary battery according to the present disclosure significantly suppresses an increase in internal resistance in a low-temperature environment and is thus improved in low-temperature input-output characteristics as compared with general batteries in which the cellulose-based binder is uniformly present in a negative electrode mixture layer.

In addition, the process for producing the nonaqueous electrolyte secondary battery according to the present disclosure secures good productivity. Specifically, the negative electrode mixture slurry used for producing the negative electrode is easily handled because of the good dispersibility of the negative electrode active material. Also, the coating film serving as the negative electrode mixture layer hardly adheres to a compressing roller, thereby suppressing contamination of the roller and accompanying deterioration of quality.

An example according to the embodiment of the present disclosure is described in detail below. A prismatic battery including a wound electrode body 3 housed in a battery case 200 which is a prismatic metal-made case is described as an example blow. However, the battery case is not limited to a prismatic shape and may be, for example, a cylindrical shape and may be a battery case composed of a laminate sheet containing a metal layer and a resin layer. In addition, the electrode body is not limited to a wound type and may have a laminated structure formed by laminating alternately, one by one, a plurality of positive electrodes and a plurality of negative electrodes through separators.

Figure 2:
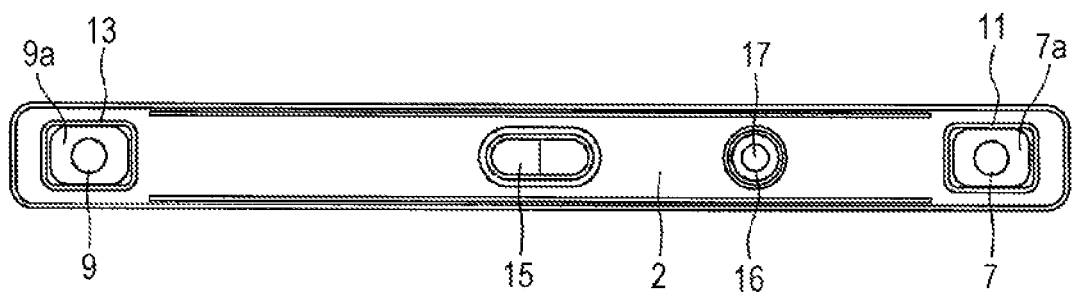
FIG. 2 is a plan view of an example of a nonaqueous electrolyte secondary battery according to an embodiment of the present disclosure.

As shown by an example in FIG. 1 and FIG. 2, a nonaqueous electrolyte secondary battery 100 includes a prismatic outer case 1 having an upper opening and a sealing plate 2 which seals the opening. The prismatic outer case 1 and the sealing plate 2 constitute the battery case 200. Each of the prismatic outer case 1 and the sealing plate 2 is made of a metal and is preferably made of aluminum or an aluminum alloy. The nonaqueous electrolyte secondary battery 100 includes a flat-shape electrode body 3, formed by winding a positive electrode and a negative electrode through a separator, and a nonaqueous electrolyte. The electrode body 3 and the nonaqueous electrolyte are housed in the prismatic outer case 1.

The nonaqueous electrolyte contains a nonaqueous solvent and an electrolyte salt dissolved in the nonaqueous solvent. Examples of the nonaqueous solvent include esters, ethers, nitriles, amides, mixed solvents of two or more of these solvents, and the like. The nonaqueous solvent may contain a halogen-substituted compound produced by at least partially substituting hydrogen of the solvent with a halogen atom such as fluorine or the like. The nonaqueous electrolyte is not limited to a liquid electrolyte and may be a solid electrolyte using a gel polymer or the like. For example, a lithium salt such as $LiPF_6$ or the like is used as the electrolyte salt.

The positive electrode has a metal-made positive electrode core and positive electrode mixture layers formed on both surfaces of the core and further has a positive electrode core exposed portion 4a formed to expose the positive electrode core along the longitudinal direction. Similarly, the negative electrode has a metal-made negative electrode core and negative electrode mixture layers formed on both surfaces of the core and further has a negative electrode core exposed portion 5a formed to expose the negative electrode core along the longitudinal direction. The electrode body 3 has a structure in which the positive electrode and the negative electrode are wound in a flat shape with the positive electrode core exposed portion 4a and the negative electrode core exposed portion 5a being disposed on the respective both sides in the axial direction.

A positive electrode current collector 6 and a negative electrode current collector 8 are connected to the laminated portions of the positive electrode core exposed portion 4a and the negative electrode core exposed portion 5a, respectively. The positive electrode current collector 6 is preferably made of aluminum or an aluminum alloy. The negative electrode current collector 8 is preferably made of copper or a copper alloy. A positive electrode terminal 7 has a flange part 7a provided outside the battery to be disposed on the sealing plate 2 and an insertion part inserted into a through hole provided in the sealing plate 2, and is electrically connected to the positive electrode current collector 6. A negative electrode terminal 9 has a flange part 9a provided outside the battery to be disposed on the sealing plate 2 and an insertion part inserted into a through hole provided in the sealing plate 2, and is electrically connected to the negative electrode current collector 8.

The positive electrode current collector 6 and the positive electrode terminal 7 are fixed to the sealing plate 2 through an inner insulating member 10 and an outer insulating member 11, respectively. The inner insulating member 10 is disposed between the sealing plate 2 and the positive electrode current collector 6, and the outer insulating member 11 is disposed between the sealing plate 2 and the positive electrode terminal 7. Similarly, the negative electrode current collector 8 and the negative electrode terminal 9 are fixed to the sealing plate 2 through an inner insulating member 12 and an outer insulating member 13, respectively. The inner insulating member 12 is disposed between the sealing plate 2 and the negative electrode current collector 8, and the outer insulating member 13 is disposed between the sealing plate 2 and the negative electrode terminal 9.

The electrode body 3 is housed in a state of being covered with an insulating sheet 14 in the prismatic outer case 1. The sealing plate 2 is welded and connected by laser welding or the like to the edge portion of the opening of the prismatic outer case 1. The sealing plate 2 has an electrolyte injection hole 16 which is sealed with a sealing plug 17 after injecting the nonaqueous electrolyte into the battery case 200. The sealing plate 2 has a gas discharge valve 15 which discharges gas when the pressure in the battery is a predetermined value or more.

The positive electrode, the negative electrode, and the separator, which constitute the electrode body, particularly the negative electrode, is described in detail below.

[Positive Electrode]

As described above, the positive electrode includes the positive electrode core and the positive electrode mixture layers formed on both surfaces of the positive electrode core. The positive electrode core can be formed by using a metal foil of aluminum, an aluminum alloy, or the like, which is stable within the potential range of the positive electrode, a film having the metal disposed in a surface layer, or the like. Each of the positive electrode mixture layers contains a positive electrode active material, a conductive material, and a binder. The positive electrode can be produced by applying a positive electrode mixture slurry, containing the positive electrode active material, the conductive material, the binder, the dispersion medium, etc., on the positive electrode core, removing the dispersion medium by drying the coating films, and then compressing the coating films to form the positive electrode mixture layers on both surfaces of the positive electrode core.

The positive electrode active material is composed of a lithium metal composite oxide as a main component. Examples of the metal element contained in the lithium metal composite oxide include Ni, Co, Mn, Al, B, Mg, Ti, V, Cr, Fe, Cu, Zn, Ga, Sr, Zr, Nb, In, Sn, Ta, W, and the like. A preferred example of the lithium metal composite oxide is a composite oxide containing at least one of Ni, Co, Mn, and Al. In addition, inorganic compound particles of aluminum oxide, a lanthanide-containing compound, or the like may be fixed to the particle surfaces of the lithium metal composite oxide.

Examples of the conductive material contained in the positive electrode mixture layers include carbon materials such as carbon black, acetylene black, Ketjen black, graphite, and the like. Examples of the binder contained in the positive electrode mixture layers include fluorocarbon resins such as polytetrafluoroethylene (PTFE), polyvinylidene fluoride (PVdF), and the like; polyacrylonitrile (PAN), polyimide, acrylic resins, polyolefin, and the like. Any one of these resins may be used in combination with a cellulose derivative such as carboxymethyl cellulose (CMC) or a salt thereof, polyethylene oxide (PEO), or the like.

[Negative Electrode]

Figure 3:
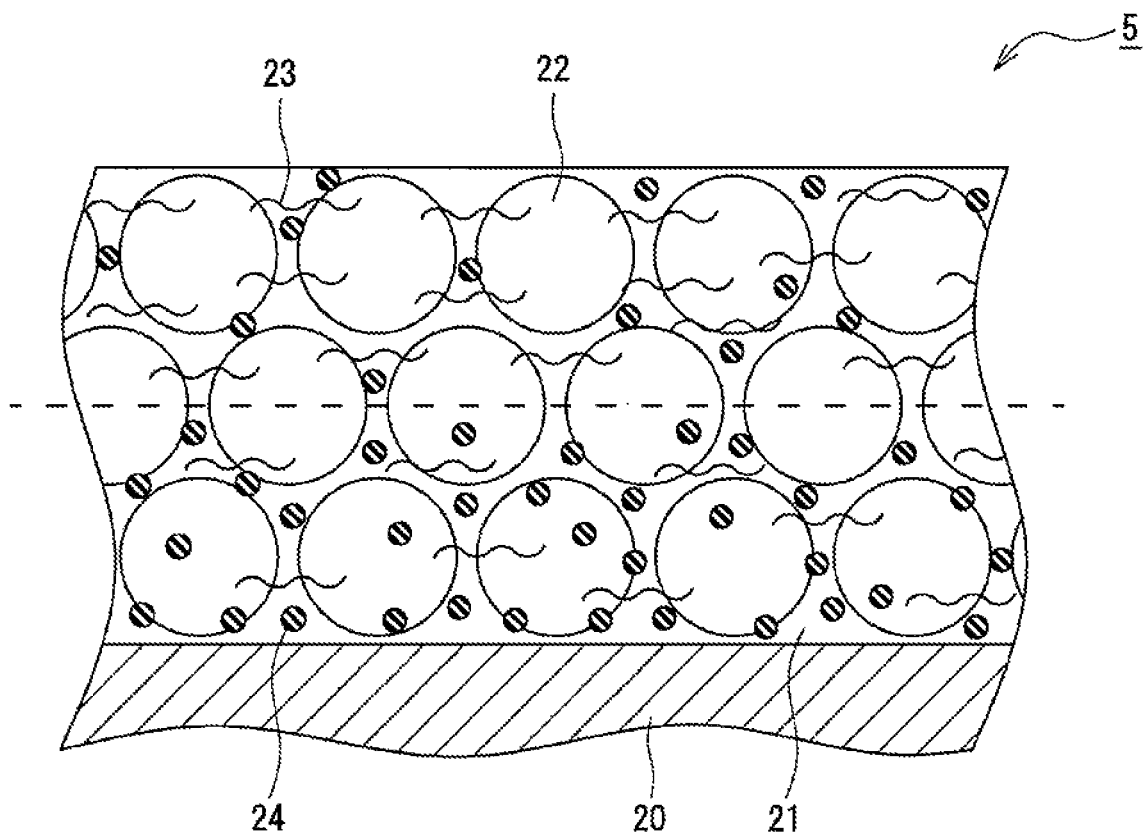
FIG. 3 is a sectional view of an example of a negative electrode according to an embodiment of the present disclosure.

FIG. 3 is a sectional view of a negative electrode 5. As shown in FIG. 3, the negative electrode 5 includes a negative electrode core 20 and negative electrode mixture layers 21 formed on both surfaces of the negative electrode core 20. Each of the negative electrode mixture layers 21 contains a negative electrode active material 22 and a cellulose-based binder 23 composed of at least one of carboxymethyl cellulose (CMC) and a salt thereof. CMC and a salt thereof function as a thickener for a negative electrode mixture slurry and also function as a binder which bonds the particles of the negative electrode active material 22 to each other. Further, each of the negative electrode mixture layers 21 preferably contains a rubber-based binder 24 composed of at least one of styrene-butadiene rubber (SBR) and a modified product thereof.

The negative electrode core 20 can be formed by using a metal foil of copper, a copper alloy, or the like, which is stable within the potential range of the negative electrode 5, a film having the metal disposed in a surface layer, or the like. The thickness of the negative electrode core 20 is, for example, 5 µm or more and 20 µm or less. Each of the negative electrode mixture layers 21 contains the negative electrode active material 22, the binder, etc. The thickness of the negative electrode mixture layer 21 on each of the sides of the negative electrode core 20 is, for example, 50 µm or more and 150 µm or less and preferably 80 µm or more and 120 µm or less. The negative electrode 5 can be produced by applying the negative electrode mixture slurry, containing the negative electrode active material 22, the binder, a dispersion medium, etc., on the negative electrode core 20, removing the medium by drying the coating films, and then compressing the coating films to form the negative electrode mixture layers 21 on both surfaces of the negative electrode core 20. Although described in detail later, the negative electrode 5 is produced by, for example, using two types of negative electrode mixture slurries having different contents of the binder added.

When each of the negative electrode mixture layers 21 is formed by using two types of negative electrode mixture slurries having different contents of the binder added, a multilayer structure containing a plurality of layers corresponding to the mixture slurries may be formed. In this case, a plurality of interfaces are present in the thickness direction of the negative electrode mixture layers 21. Even when each of the negative electrode mixture layers 21 is formed by using two types of negative electrode mixture slurries, no interface may be observed between layers. In this case, each of the negative electrode mixture layers 21 is considered to have substantially a single-layer structure.

Each of the negative electrode mixture layers 21 contains, as the negative electrode active material 22, for example, a carbon-based active material which reversibly absorbs and desorbs lithium ions. Preferred examples of the carbon-based active material include natural graphite such as flake graphite, bulk graphite, earthy graphite, and the like, artificial graphite such as massive artificial graphite (MAG), graphitized mesophase carbon microbeads (MCMB), and the like, and the like. Also, a Si-based active material composed of at least one of Si and a Si-containing compound may be used as the negative electrode active material 22, and a carbon-based active material and a Si-based active material may be used in combination.

Each of the negative electrode mixture layers 21 contains the cellulose-based binder 23 and the rubber-based binder 24 as the binder. When each of the negative electrode mixture layers 21 is divided in half, at the center in the thickness direction, into a first region near the negative electrode core 20 and a second region far from the negative electrode core 20, the content of the cellulose-based binder 23 present in the first region (region with 0% to 50% on the core side of the mixture layer when the content in the core-side surface is 0% and the content in the surface opposite to the core side is 100%) is 35% by mass or more and less than 50% by mass of the total mass of the cellulose-based binder 23 contained in the entire of each of the negative electrode mixture layers 21. That is, the content per unit volume of the cellulose-based binder 23 in the first region located on the negative electrode core 20 side is lower than that in the second region (region with 50% to 100% on the surface side of the mixture layer) located on the surface side of each of the negative electrode mixture layers 21. Decreasing the amount of the cellulose-based binder 23 having high bulkiness in the first region of each of the negative electrode mixture layers 21 promotes permeation of the electrolytic solution into the first region even in a low-temperature environment, and thus an increase in the internal resistance is considered to be suppressed. In particular, in a low-temperature environment such as at −30° C. or the like, the viscosity of the electrolytic solution is increased, and thus a large concentration gradient is easily formed in the electrolytic solution in the thickness direction of the negative electrode mixture layers 21. However, in the negative electrode mixture layers 21, the concentration gradient is relieved, and thus the internal resistance can be suppressed, thereby improving the low-temperature output characteristics.

On the other hand, when the content of the cellulose-based binder 23 present in the first region is less than 35% by mass of the total mass of the cellulose-based binder 23 contained in the entire of each of the negative electrode mixture layers 21, dispersibility of the negative electrode mixture slurry used for forming the first region is decreased, and thus the negative electrode active material 22 easily precipitates. In this case, for example, the negative electrode mixture slurry cannot be easily handled, and thus the quality of the negative electrode mixture layers 21 is made unstable. That is, when the content of the cellulose-based binder 23 is 35% by mass or more, the negative electrode mixture slurry with easy handleability can be prepared because of the good dispersibility of the negative electrode active material.

The content of the cellulose-based binder 23 present in the first region of each of the negative electrode mixture layers 21 is preferably 35% by mass or more and 45% by mass or less and more preferably 35% by mass or more and 43% by mass or less of the total mass of the cellulose-based binder 23 contained in the entire of each of the negative electrode mixture layers 21. In other words, the content of the cellulose-based binder 23 present in the second region of each of the negative electrode mixture layers 21 is over 50% by mass and 65% by mass or less, preferably 55% by mass or more and 65% by mass or less, and more preferably 57% by mass or more and 65% by mass or less of the total mass of the cellulose-based binder 23 contained in the entire of each of the negative electrode mixture layers 21.

For example, a CMC salt such as a sodium salt, an ammonium salt, or the like, which is produced by neutralizing carboxyl groups of CMC, can be used as the cellulose-based binder 23. The CMC salt is generally a partially neutralized salt produced by partially neutralizing carboxyl groups. In addition, CMC may be used alone or may be used as a mixture with a CMC salt as the cellulose-based binder 23. The weight average molecular weight of each of CMC and CMC salt is, for example, 200,000 or more and 500,000 or less.

The rubber-based binder 24 may be contained uniformly in the entire of each of the negative electrode mixture layers 21. The content of the rubber-based binder 24 present in the first region is, for example, 40% by mass or more and 75% by mass or less, preferably over 50% by mass and 75% by mass or less, and more preferably over 50% by mass and 70% by mass or less of the total mass of the rubber-based binder 24 contained in the entire of each of the negative electrode mixture layers 21. That is, the content per unit volume of the rubber-based binder 24 in the first region is preferably higher than that in the second region, and the contents (concentration distributions) of the cellulose-based binder 23 and the rubber-based binder 24 have an inverse relationship to each other in the thickness direction of the negative electrode mixture layers 21.

The adhesive strength between the negative electrode active material 22 and the negative electrode core 20 can be improved by increasing the amount of the rubber-based binder 24 in the first region of each of the negative electrode mixture layers 21. The rubber-based binder 24 has high affinity to the electrolytic solution and facilitates the permeation of the electrolytic solution into the negative electrode mixture layers 21. Therefore, about 30% of the total mass of the rubber-based binder 24 is preferably present also in the second region. In this case, the bonding force between the particles of the negative electrode active material 22 in the surface of each of the negative electrode mixture layers 21 can be sufficiently secured, and when the coating films serving as the negative electrode mixture layers 21 are compressed, the coating films hardly adhere to the compressing roller, thereby suppressing the contamination of the roller and accompanying quality deterioration.

SBR, a SBR modified product, or a mixture of SBR and SBR modified product can be used as the rubber-based binder 24. The SBR modified product may contain at least one selected from an acrylonitrile unit, an acrylate unit, an acrylic acid unit, a methacrylate unit, and a methacrylic acid unit. SBR and a modified product thereof are generally supplied in the form of a dispersion in a dispersion medium containing water as a main component.

The content of each of the cellulose-based binder 23 and the rubber-based binder 24 in each of the negative electrode mixture layers 21 is preferably 0.1% by mass or more and 3.0% by mass or less and more preferably 0.5% by mass or more and 1.5% by mass or less relative to the mass of the negative electrode active material 22. In this case, the internal resistance, the adhesion between each of the negative electrode mixture layers 21 and the negative electrode core 20, etc. can be easily improved without influences on the other battery performances. The distribution of the cellulose-based binder 23 and the rubber-based binder 24 can be measured by a method using a scanning electron microscope (SEM) described in examples.

The negative electrode 5 having the configuration described above can be produced through the following steps.

(1) The step of forming a first coating film by applying a first negative electrode mixture slurry on a surface of the negative electrode core 20.

(2) The step of forming a second coating film by applying a second negative electrode mixture slurry on the first coating film.

(3) The step of compressing the first and second coating films by using a compressing roller.

Herein, each of the first and second negative electrode mixture slurries preferably contains the negative electrode active material 22, the dispersion medium, and the cellulose-based binder 23 and further contains the rubber-based binder 24. The first negative electrode mixture slurry forms the first region of each of the negative electrode mixture layers 21, and the second negative electrode mixture slurry forms the second region of each of the negative electrode mixture layers 21. In the embodiment, the amounts of the first and second negative electrode mixture slurries applied are substantially the same, and thus the first and second coating films having substantially the same thickness are formed. In addition, the first and second compressed coating films constitute each of the negative electrode mixture layers 21.

In the steps of producing the negative electrode 5, the solid content (solid content concentration) of the cellulose-based binder 23 in the first negative electrode mixture slurry is adjusted to be lower than the solid content of the cellulose-based binder 23 in the second negative electrode mixture slurry. In addition, the first and second negative electrode mixture slurries are applied so that when each of the negative electrode mixture layers 21 is divided in half in the thickness direction, the content of the cellulose-based binder 23 present in the first region on the negative electrode core 20 side is 35% by mass or more and less than 50% by mass and preferably 35% by mass or more and 45% by mass or less of the total mass of the cellulose-based binder 23 contained in the entire of each of the negative electrode mixture layers 21. Specifically, the first and second negative electrode mixture slurries may be applied in the same amount.

Also, the solid content of the rubber-based binder 24 in the first negative electrode mixture slurry is preferably adjusted to be higher than the solid content of the rubber-based binder 24 in the second negative electrode mixture slurry. Thus, the first and second negative electrode mixture slurries are applied in the same amount so that the content per unit volume of the rubber-based binder 24 in the first region is higher than that in the second region. That is, the first and second negative electrode mixture slurries have different binder concentrations such that the concentration of the cellulose-based binder 23 in the first negative electrode mixture slurry < that in the second negative electrode mixture slurry, and the concentration of the rubber-based binder 24 in the first negative electrode mixture slurry > that in the second negative electrode mixture slurry.

When the second negative electrode mixture slurry is applied, the first coating film formed by applying the first negative electrode mixture slurry may be in a dried state or an undried state. On the other hand, the step of compressing the first and second coating films is performed after drying the coating films. Each of the coating films may be dried under gentle conditions, for example, at 60° C. for 5 minutes, in order to suppress migration of the rubber-based binder 24. The preferred dispersion medium contained in the first and second negative electrode mixture slurries may be an aqueous medium containing water as a main component, that is 100% water.

[Separator]

A porous sheet having ion permeability and insulation is used as the separator. Examples of the porous sheet include a microporous thin film, a woven fabric, a nonwoven fabric, and the like. Preferred examples of the material of the separator include olefin resins such as polyethylene, polypropylene, and the like, cellulose, and the like. The separator may have a single-layer structure or a laminated structure. In addition, a heat-resistant layer may be formed on the surface of the separator.

EXAMPLES

The present disclosure is described in further detail blow by examples, but the present disclosure is not limited to these examples.

Example 1

[Formation of Positive Electrode]

A lithium metal composite oxide represented by $LiNi_{0.35}CO_{0.35}Mn_{0.30}O_2$, carbon black, and polyvinylidene fluoride (PVdF) were mixed at a solid content mass ratio of 91:6:3, and a proper amount of N-methyl-2-pyrrolidone (NMP) was added to the resultant mixture and then kneaded to prepare a positive electrode mixture slurry. The positive electrode mixture slurry was applied on both surfaces of a positive electrode core composed of an aluminum alloy foil having a thickness of 15 μm, and the coating films were dried and then rolled by using a compressing roller. The compressed product was cut into a predetermined electrode size to form a positive electrode having positive electrode mixture layers formed on both surfaces of the positive electrode core.

[Preparation of First Negative Electrode Mixture Slurry]

A graphite powder, a CMC sodium salt, a SBR dispersion, and water were mixed at a mass ratio of 49.48:0.25:0.27 (solid content):50 to prepare a first negative electrode mixture slurry (refer to Table 1).

[Preparation of Second Negative Electrode Mixture Slurry]

A graphite powder, a CMC sodium salt, a SBR dispersion, and water were mixed at a mass ratio of 49.32:0.45:0.23 (solid content):50 to prepare a second negative electrode mixture slurry (refer to Table 1).

[Formation of Negative Electrode]

The first negative electrode mixture slurry was applied on one of the surfaces of a negative electrode core composed of a copper foil having a thickness of 8 μm by a doctor blade method (forming a first coating film), and then the second negative electrode mixture slurry was applied thereon (forming a second coating film). Similarly, the first negative electrode mixture slurry was applied on the other surface of the negative electrode core, and then the second negative electrode mixture slurry was applied thereon to form the first and second coating films. The first and second negative electrode mixture slurries were applied in the same amount to form the first and second coating films having substantially the same thickness. Next, the first and second dried coating films were compressed by using a compressing roller, and the compressed product was cut into a predetermined electrode size to form a negative electrode having negative electrode mixture layers formed on both surfaces of the negative electrode core.

[Preparation of Nonaqueous Electrolyte]

$LiPF_6$ was added so that its concentration was 1 mol/L in a mixed solvent prepared by mixing ethylene carbonate (EC), ethylmethyl carbonate (EMC), and diethyl carbonate (DEC) at a volume ratio of 3:3:4 (25° C., 1 atm), and further vinylene carbonate was added so that its concentration was 0.3% by mass, preparing a nonaqueous electrolyte.

[Formation of Battery]

The positive electrode and the negative electrode were wound through a separator composed of a polyethylene microporous film and then radially crushed to form a flat-shape electrode body having a wound structure. A positive electrode terminal was attached to a sealing plate, and a positive electrode current collector was connected to the positive electrode terminal. Also, a negative electrode terminal was attached to the sealing plate, and a negative electrode current collector was connected to the negative electrode terminal. Then, the positive electrode current collector and the negative electrode current collector were welded to a core exposed portion of the positive electrode and a core exposed portion of the negative electrode, respectively. The electrode body was housed in a prismatic outer case, and an opening of the outer case was sealed with the sealing plate. The nonaqueous electrolyte was injected from an electrolyte injection hole of the sealing plate, and then a sealing plug was attached to the injection hole, thereby forming a nonaqueous electrolyte secondary battery.

The contents of CMC and SBR, the low-temperature output characteristics of the nonaqueous electrolyte secondary battery, the precipitability of the first negative electrode mixture slurry, the adhesive strength between the negative electrode core and the negative electrode mixture layers, and contamination of the compressing roller after compression of the coating films were evaluated by methods described below. Table 2 shows the evaluation results. The values of performance evaluation results shown in Table 2 are relative values assuming that the performance evaluation results of Comparative Example 1 described later were 100.

[Measurement of Contents of CMC and SBR]

CMC and SBR were stained with two types of electronic stains, and then a cross section of the negative electrode mixture layers was exposed by using a cross section polisher method. The cross-section was observed with SEM (JSM-6500F manufactured by JEOL Ltd., acceleration voltage of about 5 kV), and the negative electrode active material, CMC, and SBR were specified from the obtained SEM image and its backscattered electron image contrast. Then, the distribution (contents in the first and second regions) of CMC and SBR in the thickness direction of the mixture layers was analyzed. In addition, CMC was stained with ruthenium tetraoxide ($RuO_4$), and SBR was stained with osmium tetraoxide ($OsO_4$).

[Evaluation of Low-Temperature Output Characteristics]

The nonaqueous electrolyte secondary battery was charged to 50% of the state of charge (SOC) under the condition of $-30°$ C. Next, the battery was discharged at a current value of each of 60 A, 120 A, 180 A, 240 A at $-30°$ C. for 10 seconds to measure the battery voltage. Then, the current values and the battery voltages were plotted, and the I-V resistance during discharge was calculated from the resultant inclination. The state of charge deviated by discharge was returned to the initial stage of charge by charging at a constant current of 5 A.

[Evaluation of Precipitability of First Negative Electrode Mixture Slurry]

The first negative electrode mixture slurry was filled in a transparent glass vessel with a scale drawn in an upper portion thereof. Then, the glass vessel was allowed to stand for 2 weeks, the first negative electrode mixture slurry was collected from above the scale of the glass vessel, and the solid content concentration was measured. The ratio of the measured value to the solid content concentration of the entire of the first negative electrode mixture slurry was calculated, and the degree of precipitation of the solid content (negative electrode active material) was evaluated. The lower ratio represents the higher degree of precipitation.

[Evaluation of Adhesive Strength (Peel Strength) Between Negative Electrode Core and Negative Electrode Mixture Layer]

One of the negative electrode mixture layers was bonded to a double-sided tape attached to a resin plate, and then the negative electrode was pulled up at a constant rate to measure the load by using a load cell when the negative electrode mixture layer was peeled from the core. The measured value was regarded as adhesive strength.

[Evaluation of Contamination of Compressing Roller]

When the first and second coating films serving as each of the negative electrode mixture layers was compressed with the compressing roller, the amount of the negative electrode mixture layers adhering to the roller was measured by the following method.

(1) The gloss of the surface of the compressing roller before compression was measured at a single angle of 60° by using a handy gloss meter (PG-II manufactured by Nippon Denshoku Industries Co., Ltd.).

(2) The gloss of the surface of the compressing roller was measured under the same conditions as in (1) after 1000-m compression of the first and second coating films.

(3) The ratio of the gloss value of the surface of the roller before compression to the gloss value of the surface of the roller after compression was calculated. The value of gloss of the compression roller decreases with increases in the amount of the negative electrode mixture layer adhering to the compressing roller. Therefore, it is found that the higher the ratio, the larger the amount of the negative electrode mixture layer adhering to the compressing roller.

Examples 2 and 3 and Comparative Examples 1 to 3

Nonaqueous electrolyte secondary batteries were formed by the same method as in Example 1 except that each of the first and second negative electrode mixture slurries was prepared at the raw material ratio shown in Table 1, and the negative electrode mixture layers were formed so that the ratios of CMC and SBR were the values shown in Table 2. Also, the performances described above were evaluated.

TABLE 1

| | First negative electrode mixture slurry | | | | Second negative electrode mixture slurry | | | |
|---|---|---|---|---|---|---|---|---|
| | Active material | CMC | SBR | Water | Active material | CMC | SBR | Water |
| Example 1 | 49.48 | 0.25 | 0.27 | 50 | 49.32 | 0.45 | 0.23 | 50 |
| Example 2 | 49.41 | 0.25 | 0.34 | 50 | 49.39 | 0.45 | 0.16 | 50 |
| Example 3 | 49.40 | 0.30 | 0.30 | 50 | 49.40 | 0.40 | 0.20 | 50 |
| Comparative Example 1 | 49.43 | 0.35 | 0.22 | 50 | 49.37 | 0.35 | 0.28 | 50 |
| Comparative Example 2 | 49.40 | 0.20 | 0.40 | 50 | 49.40 | 0.50 | 0.10 | 50 |
| Comparative Example 3 | 49.47 | 0.35 | 0.18 | 50 | 49.33 | 0.35 | 0.32 | 50 |

Table 2 shows the evaluation results of the low-temperature output characteristics, slurry precipitability, core-mixture layer adhesive strength, and compressing roller contamination in Examples 1 to 3 and Comparative Examples 1 to 3. The lower value of low-temperature output characteristics indicates the lower I-V resistance and excellent low-temperature output characteristics. The higher value of slurry precipitability indicates the smaller precipitation of the active material in the slurry and higher dispersion stability of the slurry. The higher value of core-mixture layer adhesive strength indicates the higher adhesive strength between the core and the mixture layers. The lower value of compressing roller contamination indicates the smaller amount of the coating films adhering to the compressing roller.

TABLE 2

| | Negative electrode mixture layer | | | | Evaluation | | | |
|---|---|---|---|---|---|---|---|---|
| | CMC content (%) | | SBR content (%) | | Low-temperature output characteristics | Slimy precipitability | Core-mixture layer adhesive strength | Compressing roll contamination |
| | First region | Second region | First region | Second region | | | | |
| Comparative Example 1 | 50 | 50 | 43 | 57 | 100 | 100 | 100 | 100 |

TABLE 2-continued

| | Negative electrode mixture layer | | | | Evaluation | | | |
| | CMC content (%) | | SBR content (%) | | Low-temperature output characteristics | Slimy precipitability | Core-mixture layer adhesive strength | Compressing roll contamination |
|---|---|---|---|---|---|---|---|---|
| | First region | Second region | First region | Second region | | | | |
| Comparative Example 2 | 33 | 67 | 80 | 20 | 84 | 90 | 180 | 140 |
| Comparative Example 3 | 50 | 50 | 35 | 65 | 101 | 100 | 90 | 100 |
| Example 1 | 35 | 65 | 53 | 47 | 86 | 100 | 146 | 100 |
| Example 2 | 35 | 65 | 67 | 33 | 88 | 100 | 163 | 110 |
| Example 3 | 43 | 57 | 60 | 40 | 93 | 100 | 156 | 121 |

As understood by the evaluation results shown in Table 2, any one of the batteries of the examples has excellent low-temperature output characteristics and suppresses the internal resistance low even in a low-temperature environment such as at −30° C. as compared with the batteries of Comparative Examples 1 and 3. In addition, the first negative electrode mixture slurries of the examples have excellent dispersion stability as compared with the first negative electrode mixture slurry of Comparative Example 2. Also, the negative electrodes of the examples show the high adhesive strength between the core and the mixture layers and thus little contamination of the compressing roller in the step of compressing the coating films serving as the mixture layers. That is, according to the examples, it is possible to suppress the internal resistance even in a low-temperature environment such as at −30° C. while securing good productivity.

On the other hand, in Comparative Examples 1 and 3, the electrolytic solution is not impregnated into the first region of each of the negative electrode mixture layers in a low-temperature environment, thereby failing to decrease the internal resistance. In addition, Comparative Example 3 is lack of the binder securing the adhesion at the interfaces between the mixture layers and the core and thus causes peeling and drop-off of the mixture layers from the core during assembly of the battery, thereby significantly decreasing productivity. Comparative Example 2 causes precipitation of the active material due to the small steric hindrance which supports the negative electrode active material and thus shows the poor stability performance of the mixture slurries. Also, due to the lack of the binder holding the active material in the surfaces of the negative electrode mixture layers, the coating films easily adhere to the compressing roller during compression of the coating films serving as the mixture layers, thereby significantly decreasing productivity.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A nonaqueous electrolyte secondary battery comprising:
   an electrode body having a positive electrode, a negative electrode, and a separator; and
   a nonaqueous electrolyte,
   wherein the negative electrode includes a negative electrode core and negative electrode mixture layers formed on both surfaces of the negative electrode core;
   each of the negative electrode mixture layers contains a cellulose-based binder composed of at least one of carboxymethyl cellulose and a salt thereof, and
   when each of the negative electrode mixture layers is divided in half, at the center in the thickness direction, into a first region near the negative electrode core and a second region far from the negative electrode core, wherein the second region is located beyond the center, in the thickness direction, of at least one of the negative electrode mixture layers, the content of the cellulose-based binder present in the first region is 35% by mass or more and less than 50% by mass of the total mass of the cellulose-based binder contained in the entirety of each of the negative electrode mixture layers,
   wherein each of the negative electrode mixture layers further contains a rubber-based binder composed of at least one of styrene-butadiene rubber and a modified variant of styrene-butadiene rubber that retains styrene-butadiene characteristics; and
   the content of the rubber-based binder present in the first region is over 50% by mass and 70% by mass or less of the total mass of the rubber-based binder contained in the entirety of each of the negative electrode mixture layers.

2. The nonaqueous electrolyte secondary battery according to claim 1,
   wherein the content of the cellulose-based binder present in the first region is 35% by mass or more and 45% by mass or less of the total mass of the cellulose-based binder contained in the entirety of each of the negative electrode mixture layers.

3. A nonaqueous electrolyte secondary battery comprising:
   an electrode body having a positive electrode, a negative electrode, and a separator; and
   a nonaqueous electrolyte,
   wherein the negative electrode includes a negative electrode core and negative electrode mixture layers formed on both surfaces of the negative electrode core;
   each of the negative electrode mixture layers contains a cellulose-based binder composed of at least one of carboxymethyl cellulose and a salt thereof, and
   when each of the negative electrode mixture layers is divided in half, at the center in the thickness direction, into a first region near the negative electrode core and a second region far from the negative electrode core, wherein the second region is located beyond the center, in the thickness direction, of at least one of the negative electrode mixture layer, the content of the cellulose-based binder present in the first region is 35% by mass or more and less than 50% by mass of the total mass of the cellulose-based binder contained in the entirety of each of the negative electrode mixture layers, wherein each of the negative electrode mixture layers further contains a rubber-based binder composed of at least one of styrene-butadiene rubber and a modified variant of styrene-butadiene rubber that retains styrene-butadiene characteristics; and the content of the rubber-based binder present in the first region is over 50% by mass and 60% by mass or less of the total mass of the rubber-based binder contained in the entirety of each of the negative electrode mixture layers.

* * * * *